(12) United States Patent
Zhang et al.

(10) Patent No.: US 10,250,969 B2
(45) Date of Patent: Apr. 2, 2019

(54) AIR VALVE AND SPEAKER

(71) Applicant: Goertek.Inc, Shandong (CN)

(72) Inventors: Zhibing Zhang, Shandong (CN); Gang Chen, Shandong (CN); Shuangshuang Fan, Shandong (CN)

(73) Assignee: GOERTEK INC., Shandong (CN)

( * ) Notice: Subject to any disclaimer, the term of this patent is extended or adjusted under 35 U.S.C. 154(b) by 3 days.

(21) Appl. No.: 15/540,421

(22) PCT Filed: Dec. 17, 2015

(86) PCT No.: PCT/CN2015/097751
§ 371 (c)(1),
(2) Date: Jun. 28, 2017

(87) PCT Pub. No.: WO2016/180022
PCT Pub. Date: Nov. 17, 2016

(65) Prior Publication Data
US 2018/0020283 A1 Jan. 18, 2018

(30) Foreign Application Priority Data
May 11, 2015 (CN) .......................... 2015 1 0235690

(51) Int. Cl.
*F16K 25/00* (2006.01)
*H04R 1/02* (2006.01)
(Continued)

(52) U.S. Cl.
CPC ............ *H04R 1/2811* (2013.01); *F16K 3/314* (2013.01); *F16K 7/17* (2013.01); *F16K 25/005* (2013.01);
(Continued)

(58) Field of Classification Search
CPC .......... F16K 3/314; F16K 7/17; F16K 25/005; F16K 27/0236; H04R 1/025; H04R 1/2811; H04R 2499/11
See application file for complete search history.

(56) References Cited

U.S. PATENT DOCUMENTS

2005/0220448 A1   10/2005  Tei et al.
2014/0238497 A1*  8/2014   Jones .................... F16K 15/144
                                                              137/1

FOREIGN PATENT DOCUMENTS

CN         1642355 A      7/2005
CN       102724338 A     10/2012
(Continued)

OTHER PUBLICATIONS

International Searching Authority, International Search Report (ISR) and Written Opinion for International Application No. PCT/CN2015/097751, dated Feb. 6, 2016, 10 pages, State Intellectual Property Office of the P.R.C., China.

*Primary Examiner* — Brian Ensey
(74) *Attorney, Agent, or Firm* — Alston & Bird LLP

(57) ABSTRACT

An air valve and a speaker are provided. The air valve comprises a valve body, an elastic valve plate, an air inlet penetrating through an inner surface and an outer surface of the valve body, and an air outlet penetrating through an inner surface and an outer surface of the valve plate. The valve plate is connected with the valve body in a sealing manner to form an annular sealing area encircling the air outlet and the air inlet, and the inner surface of the valve body covers the air outlet, and/or the inner surface of the valve plate covers the air inlet. The speaker is provided with or incorporates the air valve. The air valve can be opened or closed via elastic deformation of the valve plate of the air valve.

13 Claims, 5 Drawing Sheets

(51) Int. Cl.
*H04R 1/28* (2006.01)
*F16K 3/314* (2006.01)
*F16K 7/17* (2006.01)
*F16K 27/02* (2006.01)

(52) U.S. Cl.
CPC ......... *F16K 27/0236* (2013.01); *H04R 1/025* (2013.01); *H04R 2499/11* (2013.01)

(56) References Cited

FOREIGN PATENT DOCUMENTS

| | | |
|---|---|---|
| CN | 104819315 A | 8/2015 |
| CN | 204647384 U | 9/2015 |
| JP | S61-065597 A | 4/1986 |
| JP | 08-102994 A | 4/1996 |

* cited by examiner

AIR VALVE AND SPEAKER

CROSS REFERENCE TO RELATED APPLICATIONS

This application is a national stage application, filed under 35 U.S.C. § 371, of International Application No. PCT/CN2015/097751, filed Dec. 17, 2015, which claims priority to Chinese Application No. 201510235690.3, filed May 11, 2015, the contents of both of which as are hereby incorporated by reference in their entirety.

BACKGROUND

Technical Field

The present invention relates to the technical field of electroacoustic products, and more particularly, to an air valve and a speaker using the same.

Related Art

A speaker comprises a housing and a speaker body mounted thereon. A rear cavity, located behind the speaker body, is arranged in the housing. As an adjusting manner, the speaker can be adapted to audio frequency bands by adjusting the air pressure of the rear cavity, so that the speaker can generate more ideal audios in all frequency bands of the frequency response. In order to achieve the purpose of adjusting the air pressure of the rear cavity, an air valve can be mounted on the housing, so as to control suction and discharge of air in the rear cavity via the air valve, thereby adjusting the air pressure in the rear cavity via the air valve. An existing air valve mainly comprises a valve body, a valve plate and a spring. The valve plate is moved in the valve body under the action of internal and external pressure difference to open the air valve, and can close the air valve under the reset action of the spring. The existing air valve is generally larger in size as it is required to mount the valve plate, the spring and other components in the valve body and to prepare a movement space which can meet lift requirements of the valve plate in the valve body, which limits the application of a technical means in which performance of the speaker is improved by utilizing the air valve to adjust the air pressure in the rear cavity, to micro speakers. For example, the micro speakers may be speakers applied to electronic products such as mobile phones, tablet PCs, multimedia players and the like. However, in the micro speakers, spaces allowing acoustic engineers to perform performance adjustment are getting smaller and smaller, directly resulting in performance reduction of the micro speakers if the technical means cannot be applied any more.

BRIEF SUMMARY

An object of the present invention is to provide an air valve which is compact in structure and can be easily designed and manufactured to be thinner and smaller in size.

According to a first aspect of the present invention, there is provided an air valve, comprising: a valve body, an elastic valve plate, an air inlet penetrating through an inner surface and an outer surface of the valve body, and an air outlet penetrating through the inner and outer surfaces of the valve plate, wherein the valve plate is connected with the valve body in a sealing manner to form an annular sealing area encircling the air outlet and the air inlet; and wherein the inner surface of the valve body covers the air outlet, and/or the inner surface of the valve plate covers the air inlet.

In certain embodiments, the air valve further comprises a mesh fabric which covers the air outlet and is fixedly connected with the valve plate.

In certain embodiments, the mesh fabric covers the air outlet at the side of the inner surface of the valve plate, and the inner surface of the valve body covers the air outlet, so that the mesh fabric is sandwiched between the inner surface of the valve body and the inner surface of the valve plate, and the inner surface of the valve plate is spaced from the air inlet.

In certain embodiments, the air inlet is located at the outer periphery of the air outlet.

In certain embodiments, the inner surface of the valve body is provided with an inwardly recessed mounting recess, wherein the air inlet is located at a bottom of the mounting recess, and the valve plate is completely embedded into the mounting recess.

In certain embodiments, the valve plate is made from polyurethane, polyethylene terephthalate, polyether ether ketone, polycarbonate, silica gel or thermoplastic rubber.

Another object of the present invention is to provide a structure of a speaker whose performance is easy to adjust, and the speaker can be easily designed and manufactured to be thinner and small in size.

According to a second aspect of the present invention, there is provided a speaker, comprising: a housing and a speaker body mounted thereon, wherein a rear cavity leading to a diaphragm of the speaker body is formed in the housing; the housing is provided with at least one air valve described in the above as an air inlet valve, wherein an air outlet of the air inlet valve is communicated with the rear cavity; and the housing is further provided with at least one air valve described in the above as an air outlet valve, wherein an air inlet of the air outlet valve is communicated with the rear cavity.

In certain embodiments, the valve body of the air inlet valve is integrally formed with the housing, and/or the valve body of the air outlet valve is integrally formed with the housing.

In certain embodiments, the air inlet valve and the air outlet valve are arranged on different surfaces of the housing, respectively.

In certain embodiments, the housing comprises an upper housing, a middle housing and a lower housing, wherein: the middle housing comprises a middle housing body, a first groove and a second groove are formed on two opposite surfaces of the middle housing body of the middle housing, respectively, the second groove penetrates through the middle housing body to be communicated with the first groove, and the speaker body is mounted in the second groove; the upper housing is buckled with an edge of the second groove, the lower housing is buckled with an edge of the first groove and is provided with an opening for exposing the speaker body, and the speaker body is clamped with an edge of the opening, so that the first groove and the second groove are closed through a buckling structure and a clamping structure, so as to form the rear cavity.

The inventor of the present invention found that due to the complicated structure and the larger size, the air valve in the prior art is unable to be applied to products such as a micro speaker which is smaller in size and mounting space, so that applications of the air valve are greatly restricted. Therefore, the technical task to be achieved or the technical problem to be solved by the present invention is unintentional or unanticipated for those skilled in the art, and thus the present invention refers to a novel technical solution.

An exemplary benefit of the present invention is that by arranging the valve plate, which can be elastically deformed under the action of an external force, the air valve is realized with a structural design in which the air valve is opened via the elastic deformation of the valve plate and closed via the deformation recovery of the valve plate. In the structure, as it is not necessary to arrange a space for the movement of the valve plate inside the valve body or to arrange components such as a spring, the air valve provided by the present invention may be thinner, and thus can be perfectly matched with products smaller in size and mounting space. For example, the air valve provided by the present invention can be applied to a micro speaker mounted on an increasingly thinner electronic product, and an acoustic engineer can adjust the micro speaker by adjusting the air pressure of a rear cavity of the speaker so as to enable the speaker to be adapted to audio frequency bands, greatly reducing difficulty in adjusting the micro speaker in a limited space.

Further features of the present invention and advantages thereof will become apparent from the following detailed description of exemplary embodiments according to the present invention with reference to the attached drawings.

BRIEF DESCRIPTION OF THE FIGURES

The accompanying drawings, which are incorporated in and constitute a part of the specification, illustrate embodiments of the invention and, together with the description thereof, serve to explain the principles of the invention.

DESCRIPTION OF REFERENCE NUMERALS

Figure 1:
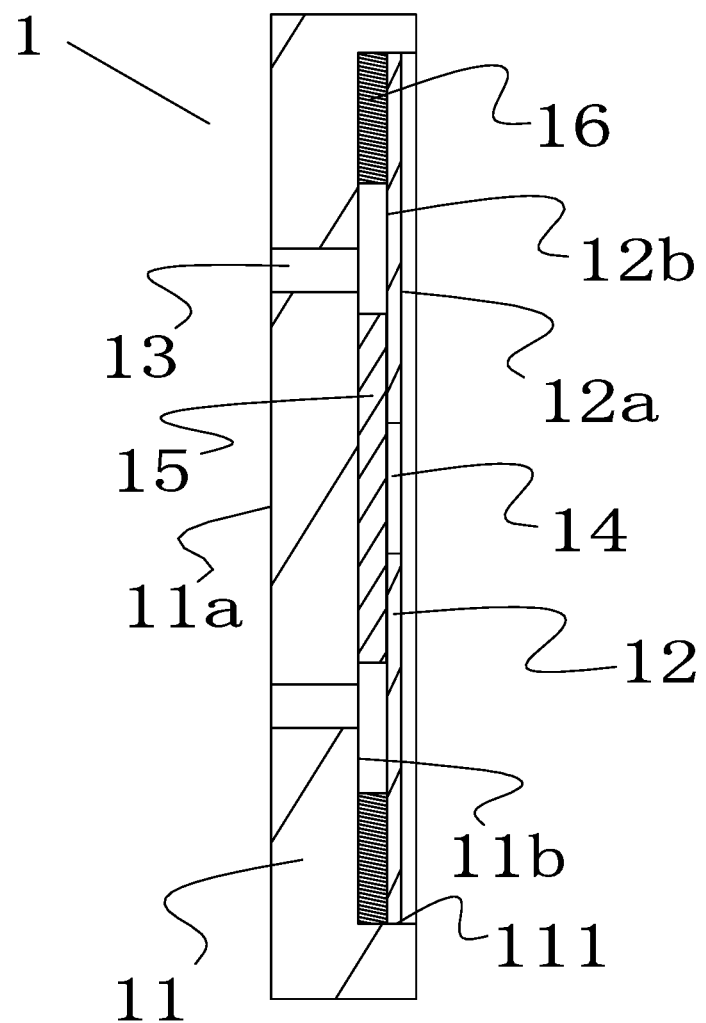
FIG. 1 is a schematically sectional view of an air valve according to an embodiment of the present invention.

1: air valve; 11: valve body; 111: mounting recess; 11a: outer surface of the valve body; 11b: inner surface of the valve body; 12: valve plate; 12a: outer surface of the valve plate; 12b: inner surface of the valve plate; 13: air inlet; 14: air outlet; 15: mesh fabric; 16: annular adhesive; 2: housing; 1a: air inlet valve; 1b: air outlet valve; 21: middle housing; 22: upper housing; 23: lower housing; 231: opening; 211: first groove; 212: second groove; 24: rear cavity; 3: speaker body; 31: diaphragm; and 32: magnetic circuit component.

DETAILED DESCRIPTION OF VARIOUS EMBODIMENTS

Various exemplary embodiments of the present invention will now be described in detail with reference to the drawings. It should be noted that the relative arrangement of the components and steps, the numerical expressions, and numerical values set forth in these embodiments do not limit the scope of the present invention unless it is specifically stated otherwise.

The following description of at least one exemplary embodiment is merely illustrative in nature and is in no way intended to limit the invention, its application, or uses.

Techniques, methods and apparatus as known by one of ordinary skill in the relevant art may not be discussed in detail but are intended to be part of the specification where appropriate.

In all of the examples illustrated and discussed herein, any specific values should be interpreted to be illustrative only and non-limiting. Thus, other examples of the exemplary embodiments could have different values.

Notice that similar reference numerals and letters refer to similar items in the following figures, and thus once an item is defined in one figure, it is possible that it need not be further discussed in the accompanying drawings.

Figure 2:
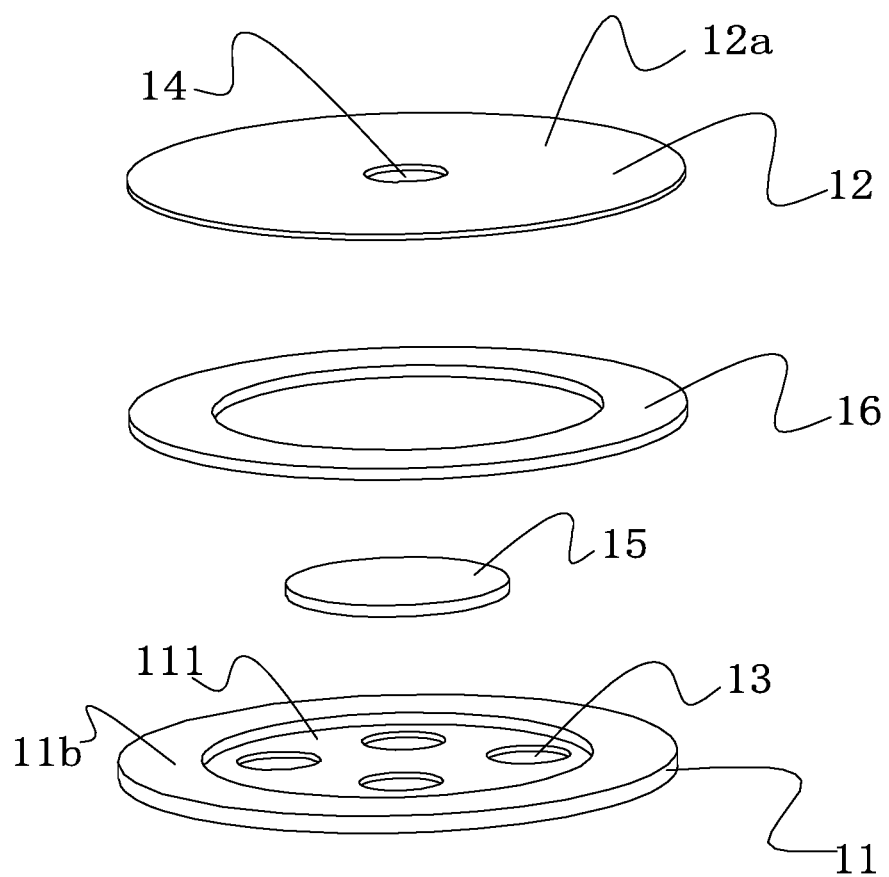
FIG. 2 is an exploded view of the air valve shown in FIG. 1.
Figure 3:
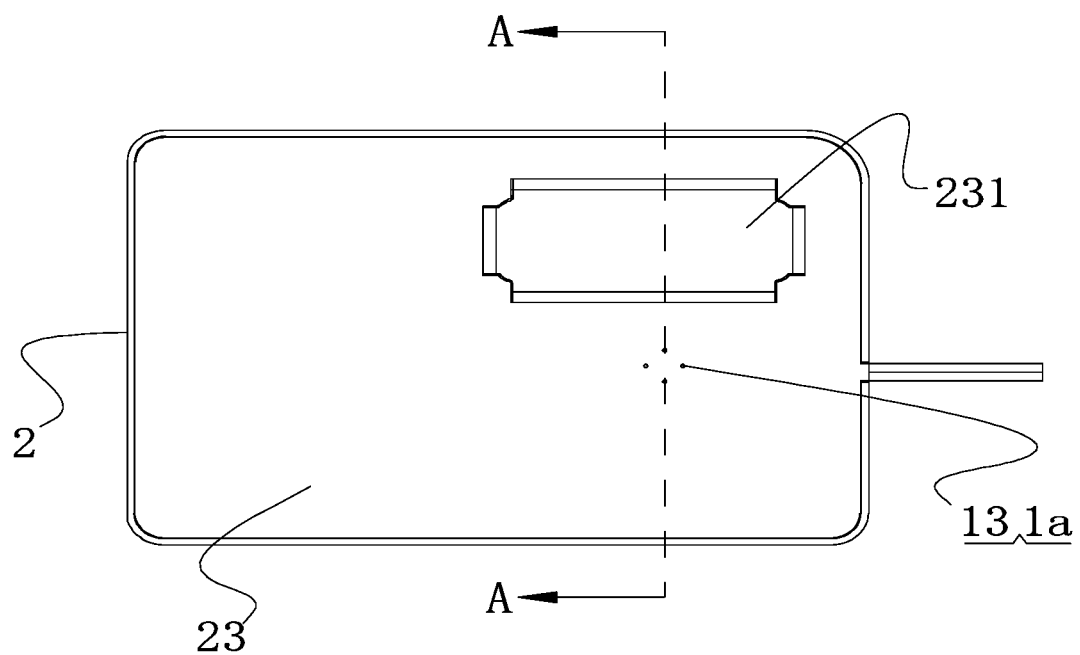
FIG. 3 is a schematically front view of a speaker according to an embodiment of the present invention.
Figure 4:
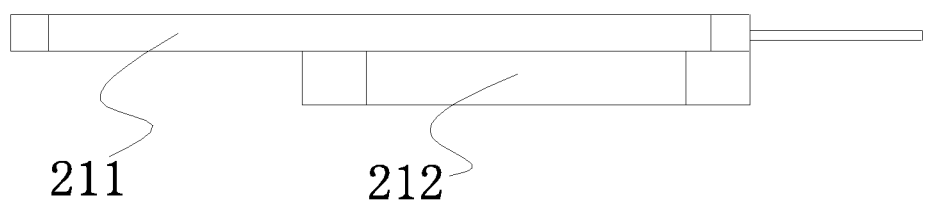
FIG. 4 is a schematically upward view of the speaker shown in FIG. 3.
Figure 5:
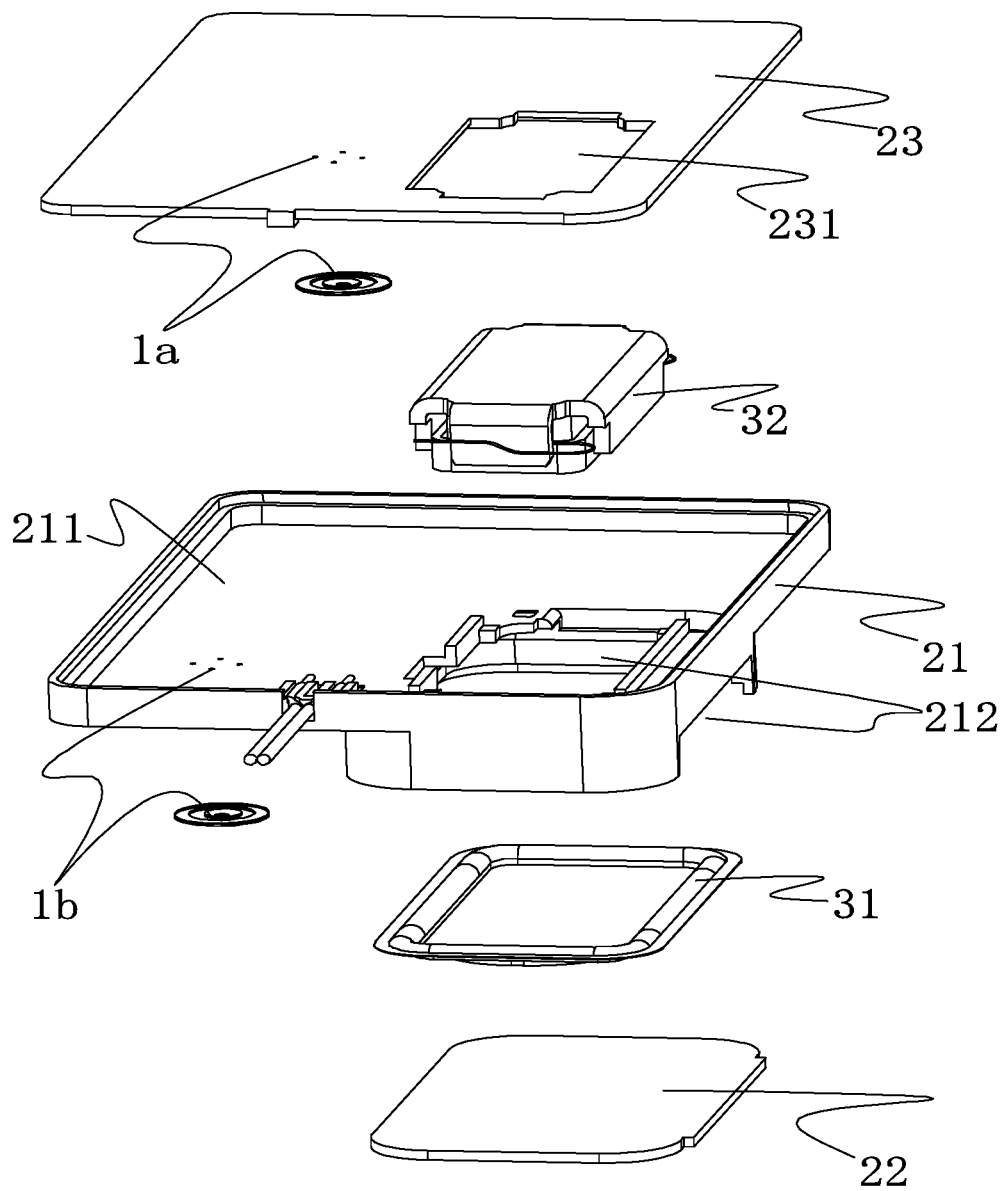
FIG. 5 is an exploded view of the speaker shown in FIG. 3.
Figure 6:
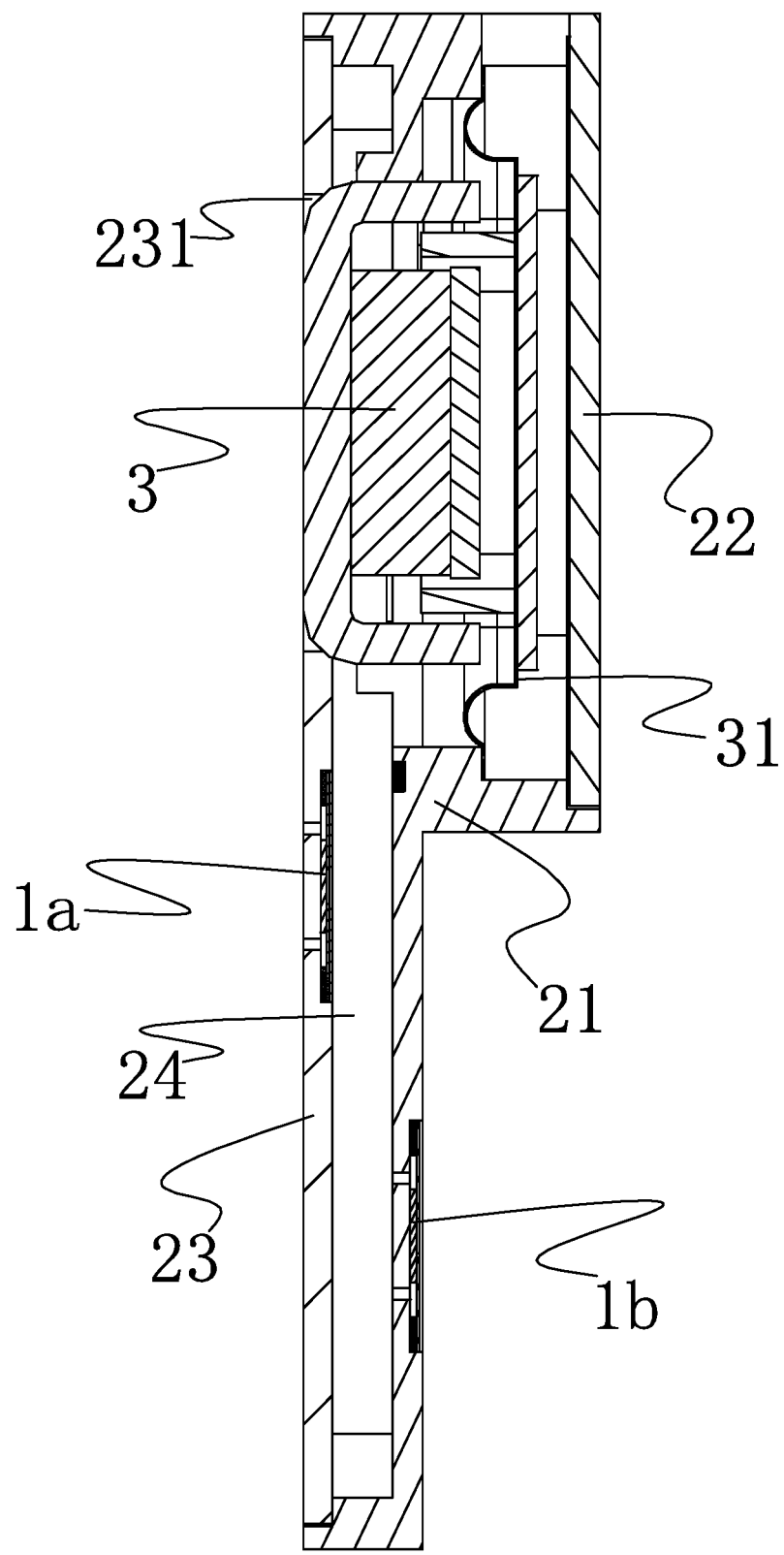
FIG. 6 is a schematically sectional view of the A-A direction in FIG. 3.

In order to solve the problem that the existing air valve is unable to be applied to a product such as a micro speaker which is smaller in size and mounting space due to its complicated structure and larger size, the present invention provides an air valve which is compact in structure, and can be easily designed and manufactured to be thinner and smaller in size. As shown in FIGS. 1 and 2, the air valve 1 provided by the present invention comprises a valve body 11, an elastic valve plate 12, an air inlet 13 penetrating through the inner and outer surfaces 11a and 11b of the valve body 11, and an air outlet 14 penetrating through the inner and outer surfaces 12a and 12b of the valve plate 12. For example, the valve plate 12 and the valve body 11 are connected with each other in a sealing manner through annular adhesive 16, laser welding or the like so as to form an annular sealing area encircling the air outlet 14 and the air inlet 13, so that a cavity between the valve body 11 and the valve plate 12 can be communicated with the outside only through the air inlet 13 and the air outlet 14. The inner surface 11b of the valve body 11 covers/shields the air outlet 14 and/or the inner surface 12b of the valve plate 12 covers the air inlet 13. That is, the inner surface 11b of the valve body 11 being opposite to the inner surface 12b of the valve plate 12. The above-mentioned "elastic" means that the valve plate 12 has such a property that it can be elastically deformed under a certain range of external force and can be fully recovered to its original state (i.e., a state where the inner surface 11b of the valve body 11 covers the air outlet 14 and/or the inner surface 12b of the valve plate 12 covers the air inlet 13) after the disappearance of the external force, wherein the external force range satisfying the elastic deformation is related to the material and the size of the valve plate 12, and the size mainly refers to the thickness of the valve plate 12 and an acting area of the external force. In practical application, a person skilled in the art needs to design the corresponding valve plate 12 according to a set opening threshold of the air valve 1 and an upper limit value of the external force of the air valve 1. In particular, the requirement is that the valve plate 12 is elastically deformed when the pressure difference between the side of the inner surface 12b of the valve plate 12 and that of the outer surface 12a of the valve plate reaches (i.e., is greater than or equal to) the opening threshold, so that at least a part of the air inlet 13 can be communicated with at least a part of the air outlet 14, thereby opening the air valve 1.

In a case that the size of the valve plate 12 is provided, material matching is taken as an example in which the smaller the opening threshold is, the greater the elasticity demand of the valve plate 12 is. Of course, the size of the valve plate 12 may be designed based on the opening threshold and the upper limit value of the external force of the air valve 1 in combination with a selected material. In practical application, any material may be selected to make the valve plate 12 so long as it can meet the specific requirements described above. For example, the valve plate 12 may be made from high polymer materials such as, but is not limited to, polyurethane (PU), polyethylene terephthalate (PET), polyether ether ketone (PEEK), polycarbonate (PC), thermoplastic rubber (TPR), silica gel or the like. As another example, the above-mentioned valve plate 12 may be made from a sheet of metal such as, but is not limited to, aluminum, steel or the like.

As shown in FIGS. 1 and 2, the working principle of the air valve 1 provided by the present invention is described as follows.

The valve plate 12 cannot be elastically deformed when the pressure difference between the side of the inner surface 12b of the valve plate 12 and that of the outer surface 12a of the valve plate 12 is smaller than a set opening threshold, and the air valve 1 will maintain a state where the inner surface 11b of the valve body 11 covers the air outlet 14 and/or the inner surface 12b of the valve plate 12 covers the air inlet 13. In this case, the air cannot pass through the air outlet 14 to flow out of the air valve 1 (i.e., through a cavity between the valve body 11 and the valve plate 12) and/or the air cannot pass through the air inlet 13 to enter the air valve 1. An access between the air inlet 13 and the air outlet 14 is cut off, so that the air valve 1 is in a closed state. Moreover, the higher the pressure of the side of the outer surface 12a of the valve plate 12 is, the better the covering effect of the inner surface 11b of the valve body 11 on the air outlet 14 is and/or the better the covering effect of the inner surface 12b of the valve plate 12 on the air inlet 13 is, so that a closing effect on an air channel of the air valve 1 is better, thereby realizing a unilateral connection effect of the air valve 1. However, the valve plate 12 is elastically deformed and stretched because it is connected with the valve body 11 in a sealing manner in the annular sealing area when the pressure difference between the side of the inner surface 12b of the valve plate 12 and that of the outer surface 12a of the valve plate 12 reaches the set opening threshold. In this case, the inner surface 12b of the valve plate 12 will be moved away from the inner surface 11b of the valve body 11, such that the covering effect of the inner surface 11b of the valve body 11 on the air outlet 14 and/or the covering effect of the inner surface 12b of the valve plate 12 on the air inlet 13 will disappear, and the access between the air inlet 13 and the air outlet 14 is communicated. Thus, the air can enter the air valve 1 via the air inlet 13 and flow out of the air valve via the air outlet 14, so that the air valve 1 is in an open state. Moreover, the higher the pressure of the side of the inner surface 12b of the valve plate 12 is, the greater the degree of opening of the air valve 1 is and the larger the flow rate of the air is.

It can be seen that by arranging the valve plate 12, which can be elastically deformed under the action of an external force satisfying an opening condition, in the air valve 1 provided by the present invention, a structural design in which the air valve 1 is opened via the elastic deformation of the valve plate 12 and the air valve 1 is closed via the deformation recovery of the valve plate 12 is realized. In this structure, as it is not necessary to arrange a space for the movement of the valve plate 12 inside the valve body 11 or to arrange components such as a spring, the air valve 1 provided by the present invention has the advantages of simple and compact structure, and small size. Moreover, the air valve 1 provided by the present invention may be designed to be thinner, so that the air valve 1 may be applied to products smaller in size and mounting space. For example, the products may be micro speakers which can be mounted on increasingly thinner electronic products.

Embodiment 1

As shown in FIGS. 1 and 2, in order to enable an acting area of the air on the side of the inner surface 12b of the valve plate 12 to be close to that on the side of the outer surface 12a of the valve plate 12, the air valve 1 provided by the present invention may adopt a structure in which the inner surface 11b of the valve body 11 covers the air outlet 14 and the inner surface 12b of the valve plate 12 is separated from the air inlet 13. In this manner, the air can pass through the air inlet 13 to enter the air valve 1, and then acts on the inner surface 12b of the valve plate 12, so that the acting area of the air on the inner surface 12b of the valve plate 12 can be close to that on the outer surface 12a of the valve plate 12 as much as possible. In this case, an opening threshold can be set according to the pressure difference between the side of the inner surface 12b of the valve plate 12 and that of the outer surface 12a of the valve plate 12, so as to facilitate the design of the air valve 1.

Embodiment 2

As shown in FIGS. 1 and 2, in order to reduce noise of the air valve 1, the air valve 1 provided by the present invention may further comprise a mesh fabric 15 which covers the air outlet 14 and is fixedly connected with the valve plate 12.

In combination with the embodiment 1, in order to realize the structure in which the inner surface 11b of the valve body 11 covers the air outlet 14 and the inner surface 12b of the valve plate 12 is spaced from the air inlet 13 in a case that the inner surface 12b of the valve plate 12 is a flat surface and at least the part, where the valve plate 12 is arranged, of the inner surface 11b of the valve body 11 is a flat surface, as shown in FIGS. 1 and 2, the mesh fabric 15 may cover the air outlet 14 at the side of the inner surface 12b of the valve plate 12 so that the mesh fabric 15 can be sandwiched between the inner surface 11b of the valve body 11 and the inner surface 12b of the valve plate 12. Therefore, the structure can achieve a benefit that the tightening degree of the covering effect of the inner surface 11b of the valve body 11 on the air outlet 14 is improved.

Embodiment 3

As shown in FIGS. 1 and 2, the air inlet 13 of the air valve 1 provided by the present invention is located at the outer periphery of the air outlet 14, so that the air outlet 14 may be arranged at the center of the valve plate 12. As the outer periphery of the valve plate 12 is connected with the valve body 11 in a sealing manner, elastic deformation of the valve plate 12 at the center will be greater with respect to the outer periphery of the annular seal area, thereby facilitating the design of the air valve 1. Moreover, in a case that there are a plurality of air inlets 13, the air outlet 14 is arranged at the center position surrounded by the air inlet 13, so that the air passing through the air inlets 13 to enter the air valve 1 can reach the air outlet 14 through accesses which are basically the same in length but different in locations, enabling the air to more smoothly and quickly pass through the air valve 1. Here, the plurality of air inlets 13 may be arranged on the circumference of a reference circle. That is, center lines of all air inlets 13 pass through the circumference of the reference circle in a perpendicular manner. In particular, the plurality of air inlets 13 can be arranged on the circumference of the reference circle at equal intervals, and the air outlet 14 is arranged within the reference circle. In embodiments as shown in FIGS. 1 and 2 in which one air outlet 14 is provided, the air outlet 14 is arranged at the center of the reference circle. That is, the center line of the air outlet 14 may pass through the center of the reference circle in a perpendicular manner.

Embodiment 4

As shown in FIGS. 1 and 2, in order to further reduce the size of the air valve 1 provided by the present invention, the inner surface 11b of the valve body 11 may be provided with an inwardly recessed mounting recess 111; the air inlet 13 is located at the bottom of the mounting recess 111; and the valve plate 12 is completely embedded into the mounting recess 111. In that way, the size of the air valve 1 is the same as that of the valve body 11.

The present invention further provides a speaker based on the air valve 1 provided by the present invention. As shown in FIGS. 3-6, the speaker provided by the present invention comprises a housing 2 and a speaker body 3 mounted thereon, wherein a rear cavity 24 leading to a diaphragm 31 of the speaker body 3 is formed in the housing 2. The housing 2 is provided with at least one air valve 1 described in the above as an air inlet valve 1a. An air outlet 14 of the air inlet valve 1a faces the rear cavity 24, so that external air can pass through the air inlet valve 1a to enter the rear cavity 24. The housing 2 is also provided with at least one air valve 1 described in the above as an air outlet valve 1b. An air inlet 13 of the air outlet valve 1b faces the back cavity 24, so that the air in the rear cavity can pass through the air outlet valve 1b to flow to the outside. As for the speaker with such a structure, the performance of the speaker can be improved by adjusting the pressure air cushion which is generated in the rear cavity 24 and assists the diaphragm 31, so that the speaker has the advantages that a high performance of the speaker can be achieved by adjusting in a limited space. This is particularly important for micro speakers capable of being applied to increasingly thinner electronic products such as mobile phones, tablet PCs, multimedia players, etc. In addition, the air valve 1 provided by the present invention has the advantages of being smaller in size and being thinner, so that it is possible to apply this adjusting means to the micro speakers.

The above-described air inlet valve 1a may be combined with the housing 2 via a threaded connection structure, a tapered seal structure, interference fit, etc. As the thickness of the air valve 1 may be the same as that of the housing 2, there is no influence on the size and the mounting space of the speaker when the air valve 1 provided by the present invention is arranged on the speaker. In addition, as shown in FIGS. 3-6, the advantages of the air valve 1 further lie in that the valve body 11 of the air inlet valve 1a may be integrally formed with the housing 2, and the valve body 11 of the air outlet valve 1b may be integrally formed with the housing 2, so that basically, the arrangement of the air valves 1 will not add any burden to an assembling process of the speaker.

In order to avoid mutual interference between inlet air and outlet air so as to keep the generation of a next pressure air cushion and the disappearance of a current pressure air cushion relatively independent, as shown in FIGS. 3-6, the air inlet valve 1a and the air outlet valve 1b may be arranged on different surfaces of the housing 2, respectively. In the embodiments as shown in FIGS. 3-6, the speaker provided by the present invention is provided with one air inlet valve 1a and one air outlet valve 1b which are arranged on the opposite surfaces of the housing 2.

In addition to using the air valve 1 provided by the present invention to reduce the size and the thickness of the speaker, the present invention further provides a housing structure with a smaller thickness. As shown in FIGS. 3-6, the housing 2 comprises an upper housing 22, a middle housing 21 and a lower housing 23. The middle housing 21 comprises a middle housing body; a first groove 211 and a second groove 212 are formed on two opposite surfaces of the middle housing body of the middle housing 21, respectively; the second groove 212 penetrates through the middle housing body to be communicated with the first groove 211; and the speaker body 3 is mounted in the second groove 212. The lower housing 23 is buckled with an edge of the first groove 211 and is provided with an opening 231 for exposing the speaker body 3, and the speaker body 3 (particularly, a basin frame of a magnetic circuit component 32 of the speaker body 3) is clamped with an edge of the opening 231. The upper housing 22 is buckled with an edge of the second groove 212. The first groove 211 and the second groove 212 are closed through the above-described buckling structure or the clamping structure to form the rear cavity 21 leading to the diaphragm 31, so that the rear cavity 24 is communicated with the outside only via the air inlet valve 1a and the air outlet valve 1b, thereby achieving a purpose of adjusting the pressure air cushion in the rear cavity 24 via the air inlet valve 1a and the air outlet valve 1b. With respect to the structure of the above housing 2, as the thickness of other parts, except for the second groove 212 in which the speaker body 3 is arranged, of the middle housing 21 may be smaller, the housing 2 may be designed and manufactured to be smaller and thinner.

Otherwise, although the above embodiments mainly describe differences from other embodiments, it should be clear for those skilled in the art that the above-described embodiments may be used alone or in combination with each other as required.

Although some specific embodiments of the present invention have been demonstrated in detail with examples, it should be understood by a person skilled in the art that the above examples are only intended to be illustrative but not to limit the scope of the present invention. It should be understood by those skilled in the art that the above embodiments can be modified without departing from the scope and spirit of the present invention. The scope of the present invention is defined by the appended claims.

What is claimed is:

1. An air valve, comprising:
   a valve body;
   an elastic valve plate;
   an air inlet penetrating through an inner surface and an outer surface of the valve body;
   an air outlet penetrating through an inner surface and an outer surface of the valve plate; and
   a mesh fabric that covers the air outlet and is fixedly connected with the valve plate,
   wherein:
      the valve plate is connected with the valve body in a sealing manner to form an annular sealing area encircling the air outlet and the air inlet; and
      at least one of: (a) the inner surface of the valve body covers the air outlet; or (b) the inner surface of the valve plate covers the air inlet.

2. The air valve of claim 1, wherein the mesh fabric covers the air outlet at the side of the inner surface of the valve plate, and the inner surface of the valve body covers the air outlet, so that the mesh fabric is sandwiched between the inner surface of the valve body and the inner surface of the valve plate, and the inner surface of the valve plate is spaced from the air inlet.

3. The air valve of claim 1, wherein the air inlet is located at the outer periphery of the air outlet.

4. The air valve of claim 1, wherein:
the inner surface of the valve body is provided with an inwardly recessed mounting recess;
the air inlet is located at a bottom of the mounting recess; and
the valve plate is completely embedded into the mounting recess.

5. The air valve of claim 1, wherein the valve plate is made from at least one of: polyurethane, polyethylene terephthalate, polyether ether ketone, polycarbonate, silica gel or thermoplastic rubber.

6. A speaker, comprising:
a housing; and
a speaker body mounted on the housing,
wherein:
  a rear cavity leading to a diaphragm of the speaker body is formed in the housing,
  the housing is provided with at least one air valve configured as an air inlet valve, and an air outlet of the air inlet valve is communicated with the rear cavity;
  the housing is further provided with at least one air valve configured as an air outlet valve, and an air inlet of the air outlet valve is communicated with the rear cavity; and
  each of the air inlet valve and the air outlet valve comprise:
    a valve body;
    an elastic valve plate;
    an air inlet penetrating through an inner surface and an outer surface of the valve body; and
    an air outlet penetrating through an inner surface and an outer surface of the valve plate,
    wherein:
      the valve plate is connected with the valve body in a sealing manner to form an annular sealing area encircling the air outlet and the air inlet; and
      at least one of: (a) the inner surface of the valve body covers the air outlet; or (b) the inner surface of the valve plate covers the air inlet.

7. The speaker of claim 6, wherein at least one of:
the valve body of the air inlet valve is integrally formed with the housing; or
the valve body of the air outlet valve is integrally formed with the housing.

8. The speaker of claim 6, wherein the air inlet valve and the air outlet valve are arranged on different surfaces of the housing, respectively.

9. The speaker of claim 6, wherein:
the housing comprises an upper housing, a middle housing and a lower housing;
the middle housing comprises a middle housing body, wherein a first groove and a second groove are formed on two opposite surfaces of the middle housing body of the middle housing, respectively, the second groove penetrates through the middle housing body so as to be communicated with the first groove, and the speaker body is mounted in the second groove; the upper housing is buckled with an edge of the second groove; and
the lower housing is buckled with an edge of the first groove, and is provided with an opening for exposing the speaker body, and the speaker body is clamped with an edge of the opening, so that the first groove and the second groove are closed through a buckling structure and a clamping structure, so as to form the rear cavity.

10. An air valve, comprising:
a valve body;
an elastic valve plate;
an air inlet penetrating through an inner surface and an outer surface of the valve body; and
an air outlet penetrating through an inner surface and an outer surface of the valve plate,
wherein:
  the valve plate is connected with the valve body in a sealing manner to form an annular sealing area encircling the air outlet and the air inlet;
  at least one of: (a) the inner surface of the valve body covers the air outlet; or (b) the inner surface of the valve plate covers the air inlet; and
  the air inlet is located at the outer periphery of the air outlet.

11. The air valve of claim 10, wherein a mesh fabric covers the air outlet at the side of the inner surface of the valve plate, and the inner surface of the valve body covers the air outlet, so that the mesh fabric is sandwiched between the inner surface of the valve body and the inner surface of the valve plate, and the inner surface of the valve plate is spaced from the air inlet.

12. The air valve of claim 10, wherein:
the inner surface of the valve body is provided with an inwardly recessed mounting recess;
the air inlet is located at a bottom of the mounting recess; and
the valve plate is completely embedded into the mounting recess.

13. The air valve of claim 10, wherein the valve plate is made from at least one of: polyurethane, polyethylene terephthalate, polyether ether ketone, polycarbonate, silica gel or thermoplastic rubber.

* * * * *